BEST AVAILABLE COPY

Nov. 14, 1967 M. J. M. KONINGS 3,352,969

VIDEO AMPLIFIER IN WHICH BANDWIDTH IS A FUNCTION OF SIGNAL AMPLITUDE

Filed Aug. 20, 1964 2 Sheets-Sheet 1

INVENTOR
MARCEL J.M. KONINGS
BY
Frank R. Jeifari
AGENT

BEST AVAILABLE COPY

Nov. 14, 1967 M. J. M. KONINGS 3,352,969
VIDEO AMPLIFIER IN WHICH BANDWIDTH IS
A FUNCTION OF SIGNAL AMPLITUDE
Filed Aug. 20, 1964 2 Sheets-Sheet 2

INVENTOR
MARCEL J.M. KONINGS
BY
[signature]
AGENT

BEST AVAILABLE COPY

United States Patent Office 3,352,969
Patented Nov. 14, 1967

3,352,969
VIDEO AMPLIFIER IN WHICH BANDWIDTH IS A FUNCTION OF SIGNAL AMPLITUDE

Marcel Johan Marie Konings, Emmasingel, Eindhoven, Netherlands, assignor to North American Philips Company, Inc., New York, N.Y., a corporation of Delaware Filed Aug. 20, 1964, Ser. No. 390,792
Claims priority, application Netherlands, Aug. 21, 1963, 296,951
8 Claims. (Cl. 178—7.1)

ABSTRACT OF THE DISCLOSURE

A video amplifier in which the bandwidth is a function of the signal amplitude. In one embodiment two amplifiers have a common load, but different frequency characteristics, and one amplifier is biased to be cut-off until the signal input exceeds a given level. In another embodiment an amplifier has a non-linear impedance in parallel with its load resistor, and a frequency dependent network in its common electrode circuit.

This invention relates to amplifying circuits in television equipment for amplifying television signals including at least one amplifying element.

In such amplifying circuits, especially in those at the pick-up and where a comparatively weak input signal for the amplifier of the pick-up tube becomes available, the signal-to-noise ratio plays an important part, for the better this signal-to-noise ratio, the better the image ultimately displayed.

To decrease the influence of noise in such amplifying circuits in television equipment, the amplifying circuit according to the invention is characterized in that it has a bandwidth which is much smaller for the dark portions than for the bright portions in the image to be displayed with the aid of the amplified television signals.

The amplifying circuit according to the invention is based on the following recognitions:

(1) The noise is proportional to the square root of the bandwidth.

(2) The noise is most troublesome in the dark portions of the image.

Point 2 is based on the fact that the noise which becomes manifest as white and black dots and dashes in the displayed image, is observed by the human eye most clearly in the dark portions of the image. This is presumably attributable to the fact that the noise amplitudes cause a smaller variation in contrast with respect to white than with respect to black. This is comparable to the notion modulation depth. If the noise is constant the modulation depth is smaller for white than for black so that, as has been found from experiments, a signal-to-noise ratio of approximately 80:1 is necessary for the dark portions to ensure that the noise is hardly perceptible to the observer of the image, whereas the bright portions require only a signal-to-noise ratio of approximately 30:1 to obtain the same result.

(3) The definition of the image is improved as the bandwidth becomes greater.

(4) The definition of the image displayed on a display tube is determined especially by the definition in the bright portions of the image.

The latter point is also based on the properties of the human eye which has a tendency to accommodate to the bright portions of the image so that more details of the bright portions than of the dark portions of the displayed image will be observed.

By giving the amplifying circuit a comparatively small bandwidth, for example of 1.5 mc./s., for the dark portions the influence of noise for the dark portions has much decreased in view of the phenomenon mentioned sub 1.

From the remark under point 2 it appears that the signal-to-noise ratio may be worse for the bright portions than for the dark portions. This fact may advantageously be utilized by giving the amplifying cicuit a comparatively great bandwidth, for example of 8 mc./s., for the bright portions so that the influence of noise increases for the bright portions. The foregoing is necessary because in view of the facts mentioned under points 3 and 4 a greater bandwidth is necessary for the bright portions to observe an image with satisfactory definition.

In order that the invention may be readily carried into effect, it will now be described in detail, by way of example, with reference to several embodiments shown in the accompanying diagrammatic drawings, in which.

Figure 1:
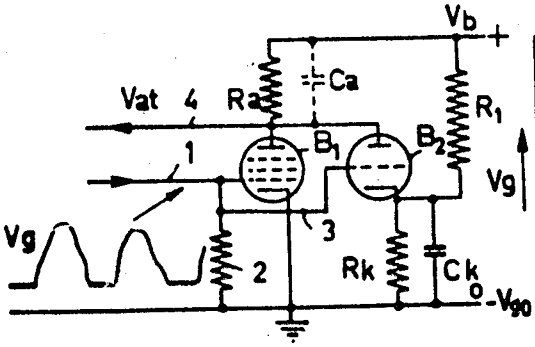
FIGURE 1 shows a first embodiment.

The amplifying circuit shown in FIGURE 1 includes two amplifying elements $B_1$ and $B_2$. An input signal $V_g$ is applied through a lead 1 and a resistor 2 to the first amplifying element $B_1$ which is in the form of a tube. The black level of input signal $V_g$ (which is an ordinary television signal) is constantly maintained at a given negative bias $-V_{go}$ during the so-called horizontal fly-back period, for example by means of a preceding clamp circuit. The input signal $V_g$ thus can lie completely in the grid space of tube $B_1$. The input signal is also applied through a lead 3 to the second amplifying element $B_2$ which, according to the principle of the invention, is active as a delay element and for this purpose is biased by means of a cathode resistor $R_k$ because a direct voltage will invariably be set up across the cathode resistor $R_k$ irrespective of whether the tube $B_2$ conveys current or not, since the junction point of the resistor $R_k$ and the cathode of tube $B_2$ is also connected through another ohmic resistor $R_1$ to the positive terminal of the supply voltage source which delivers a supply voltage of $V_1$ volts.

The interconnected anodes of the tubes $B_1$ and $B_2$ are also connected through a common anode resistor $R_a$ to the positive terminal of the supply voltage source. FIGURE 1 shows that a parasitic capacitance $C_a$ is present parallel to the anode resistor $R_a$. Said parasitic capacitance is formed not only by the parasitic capacitance of the anode resistor $R_a$ but also by the anode-cathode capacitance of the tubes $B_1$ and $B_2$. That the parasitic capacitance $C_a$ is shown parallel to the anode resistor $R_a$ is correct since that end of resistor $R_a$ which is remote from the anodes of the tubes $B_1$ and $B_2$ may be imagined to be connected to earth for alternating current so that the parasitic capacitances of the tubes $B_1$ and $B_2$, which are located between anode and earth, are still connected parallel to the resistor $R_a$ with respect to alternating current.

The output signal $V_{at}$ may be derived from a lead which is connected to the through-connection of the two anodes of the tubes $B_1$ and $B_2$.

The circuit arrangement of FIGURE 1 operates as follows: First of all the amplifying action of the first amplifying element $B_1$ will be considered. The input signal $V_g$ is applied to this amplifying element so that an output

BEST AVAILABLE COPY voltage $V_{a1}$ set up across the anode impedance will be given by the equation:

$$V_{a1}=i_{a1}\times\frac{R_a}{1+j\omega C_aR_a}=S_1V_g\times\frac{R_a}{1+j\omega C_aR_a} \quad (1)$$

From this it follows that the amplification of the tube $B_1$ alone is given by:

$$\left|\frac{V_{a1}}{V_g}\right|=\frac{S_1R_a}{(1+\omega^2R_a^2C_a^2)^{1/2}} \quad (2)$$

Figures 3, 4:
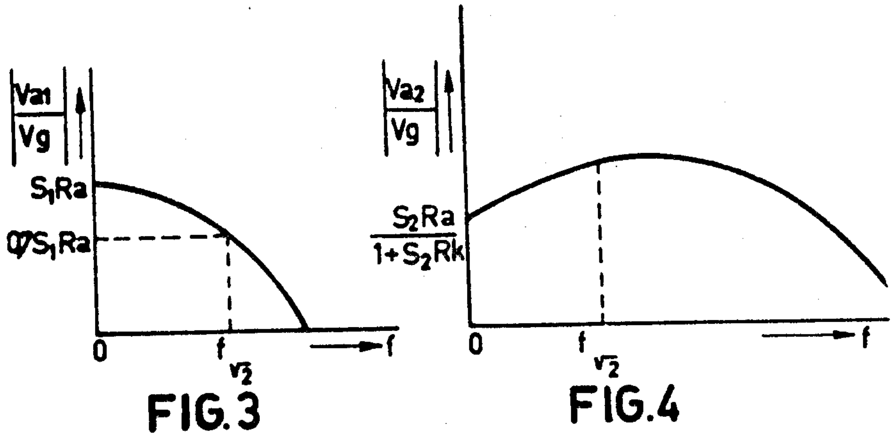
FIGURE 3 shows a frequency response curve of a first portion of the circuit of FIGURE 1.
FIGURE 4 shows a frequency response curve of a second portion of the circuit of FIGURE 1.

The frequency response curve which follows from Equation 2 is shown in FIGURE 3. From Equation 2 it follows that for a frequency zero the tube $B_1$ will have its maximum amplification which is equal to $S_1R_a$. For the so-called $\sqrt{2}$ value the amplification of the tube $B_1$, due to the presence of the parasitic capacitance $C_a$, will have decreased to a value of 0.7 $S_1R_a$, which so-called $\sqrt{2}$ value is indicated by $f\sqrt{2}$ in FIGURE 3. The bandwidth of the amplifier $B_1$ will thus be equal to the frequency $f\sqrt{2}$ which is chosen to be approximately 1.5 mc./s. in the embodiment of FIGURE 1 and which is given, as may be deduced from Equation 2, by:

$$f\sqrt{2}=\frac{1}{2\pi R_aC_a}$$

Since the input signal $V_g$ is directly applied to the tube $B_1$ this implies that the complete signal applied to tube $B_1$ will be amplified with a comparatively small bandwidth, namely the said $\sqrt{2}$ value, so that as a result of the small bandwidth the influence of noise is small because in view of the fact mentioned under point 1 the noise is proportional to the sequare root of the bandwidth.

Figure 2:
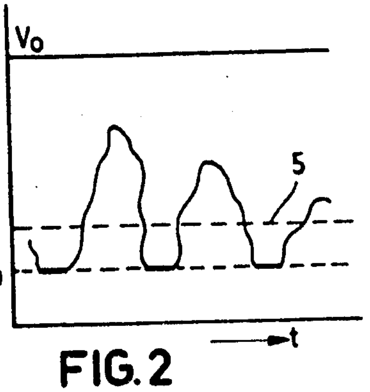
FIGURE 2 shows an input signal such as applied to the input of the amplifier of FIGURE 1.

To ensure that only the dark portions in the image are amplified with this small bandwidth, the second amplifying element $B_2$, which is active as a delay element in the embodiment of FIGURE 1, is biased by means of the resistors $R_1$ and $R_k$. From this it follows that the input signal $V_g$ will cause anode current to flow through tube $B_2$ only if the input signal $V_g$ exceeds the value indicated by the broken line 5 in FIGURE 2. It will be evident that the level of the line 5 is determined by the values of the resistors $R_1$ and $R_k$ since the latter determine the voltage at the cathode of tube $B_2$. The location of the signal $V_g$ with respect to earth is shown in FIGURE 2 in which the voltage $V_0$ corresponds to earth potential and the voltage $-V_{g0}$ indicates the black level of the signal with respect to earth. When tube $B_2$ starts to convey current it will be evident that the amplification of the complete circuit is no longer determined by the tube $B_1$ alone but also by the tube $B_2$. In order to find out how the frequency response curve of the circuit will be if both tubes $B_1$ and $B_2$ convey current, it is first examined how the frequency response curve will be for the tube $B_2$ alone. From the foregoing it will then be evident that the total frequency response curve applies only to the bright portions in the image since the tube $B_2$ will start to convey current only if the signal $V_g$ exceeds the level of the line 5.

The anode voltage $V_{a2}$ of the tube $B_2$, if this tube alone conveys current, is given by the equation:

$$V_{a2}=i_{a2}\frac{R_a}{1+j\omega C_aR_a}=\frac{S_2V_gR_a}{1+\dfrac{S_2R_k}{1+j\omega C_kR_k}}\times\frac{1}{1+j\omega R_aC_a} \quad (3)$$

From Equation 3 it follows that the amplification of tube $B_2$ alone is given by the equation:

$$\left|\frac{V_{a2}}{V_g}\right|=\frac{S_2R_a}{(1+\omega^2R_a^2C_a^2)^{1/2}}\times\frac{(1+\omega^2C_k^2R_k^2)^{1/2}}{(1+S_2R_k)^2+\omega^2C_k^2R_k^{2\,1/2}} \quad (4)$$

The frequency response curve which follows from Equation 4 is shown in FIGURE 4 which also indicates the $\sqrt{2}$ value of FIGURE 1. From FIGURE 4 it may be seen that the amplification of tube $B_2$ alone, when starting from the frequency zero, will initially increase to decrease afterwards when the influence of the anode capacitance $C_a$ will increase. This result may be achieved by means of a time constant $C_kR_k$ which is greater than the time constant $R_aC_a$ so that for the lower frequencies the influence of the negative feedback network $R_kC_k$ will decrease more rapidly than the influence of the impedance $R_aC_a$ in the anode circuit will increase. It is thus achieved that the total frequency response curve of the circuit in FIGURE 1 will be raised for the higher frequencies and this raising, as will be evident from the foregoing, will hold good only for the bright portions in the image, that is to say for the portions located above the level indicated by the line 5. The latter is more clarified with the aid of the frequency response curve of FIGURE 5 which is the sum of the frequency response curves of FIGURES 3 and 4. That it is permitted to add together the frequency response curves of FIGURES 3 and 4 follows from the equation:

$$V_{at}=(i_{a1}+i_{a2})\frac{R_a}{1+j\omega R_aC_a}=V_{a1}+V_{a2} \quad (5)$$

which equation indicates that the total anode voltage $V_{at}$ which may be derived from the lead 4 is the sum of the voltages set up across the anode impedance as a result of the sum of the anode currents of the tubes $B_1$ and $B_2$. It is thus readily permitted to add together the anode voltages $V_{a1}$ and $V_{a2}$ which are given by the Equations 1 and 3.

From Equation 5 it follows that the total amplification of the circuit of FIGURE 1 is given by:

$$\left|\frac{V_{at}}{V_g}\right|=\left|\frac{V_{a1}+V_{a2}}{V_g}\right|$$

and from this it follows with the aid of the Equations 1 and 2 that for the frequency zero we have:

$$\left|\frac{V_{a1}+V_{g2}}{V_g}\right|=S_1R_a+\frac{S_2R_a}{1+S_2R_a} \quad (6)$$

Figure 5:
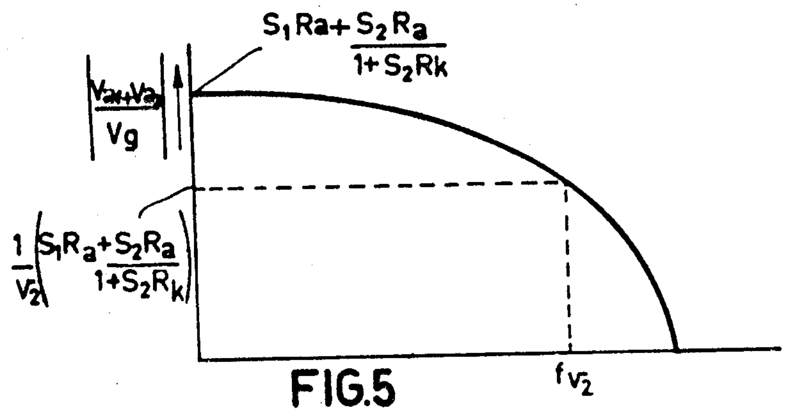
FIGURE 5 shows the total frequency response curve of the circuit of FIGURE 1 for the bright portions of the television image.

The Equation 6 is shown in FIGURE 5 which also indicates the $\sqrt{2}$ value for the total frequency response curve of the circuit of FIGURE 1, which value is indicated by $f'\sqrt{2}$ in FIGURE 5. The value for $f'\sqrt{2}$ is assumed to be 8 mc./s., for the embodiment of FIGURE 1 so that the bandwidth is approximately 8 mc./s. for this embodiment.

Thus the conditions are given for an improvement in the signal-to-noise ratio since the amplifying circuit of FIGURE 1 will have a bandwidth of approximately 1.5 mc./s. for the dark portions and a bandwidth of approximately 8 mc./s. for the bright portions in the image.

It will be evident that the selected numerical examples of 1.5 mc./s. and 8 mc./s. have been given only by way of example and inspired by the signal-to-noise ratios mentioned in the preamble, which were 80:1 for the dark portions and 30:1 for the bright portions in the image, the notion "weighed noise" having been disregarded for reasons of simplicity. Since the signal-to-noise ratio required for the dark portions is thus approximately 2.5 times as high as that for the bright portions the bandwidth for the dark portions must be approximately 6 times smaller than that for the bright portions. However, it will be evident that other signal-to-noise ratios apply for other examples so that in this case the ratio between the bandwidths, that is to say the ratio between the values $f'\sqrt{2}$ and $f\sqrt{2}$ will also have to be chosen differently.

It is to be noted that transistors instead of the tubes $B_1$ and $B_2$ may be used as amplifying elements. The circuit will then operate in exactly the same manner as described above.

Figure 6:
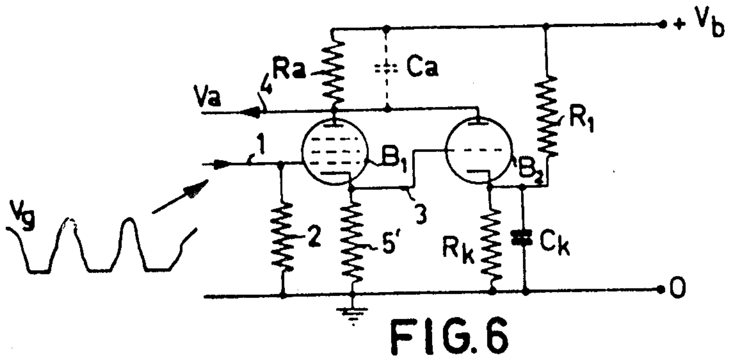
FIGURE 6 shows an embodiment which is slightly modified with respect to FIGURE 1.

FIGURE 6 shows an amplifying circuit which is slightly modified with respect to FIGURE 1. The modification consists in that the amplifying tube $B_1$ now also includes a resistor for the cathode, namely a resistor 5', across which the signal is developed which is applied to the control grid of the second amplifying element $B_2$. Since the tube $B_1$ will act as a cathode follower with respect to the signal applied to tube $B_2$ and since for a cathode follower the amplification is approximately unity, it may be assumed also in this case that the input signal $V_g$ is applied to the second biased amplifying element $B_2$. The operation of the circuit shown in FIGURE 6 differs from that of FIGURE 1 only in that the resistor 5' will also cause a certain negative feedback for the tube $B_1$ so that the amplification of tube $B_1$ will be a little less than in the embodiment of FIGURE 1. However, the considerations for the frequency response curves and for the amplification of the dark and bright portions are similar.

Figure 7:
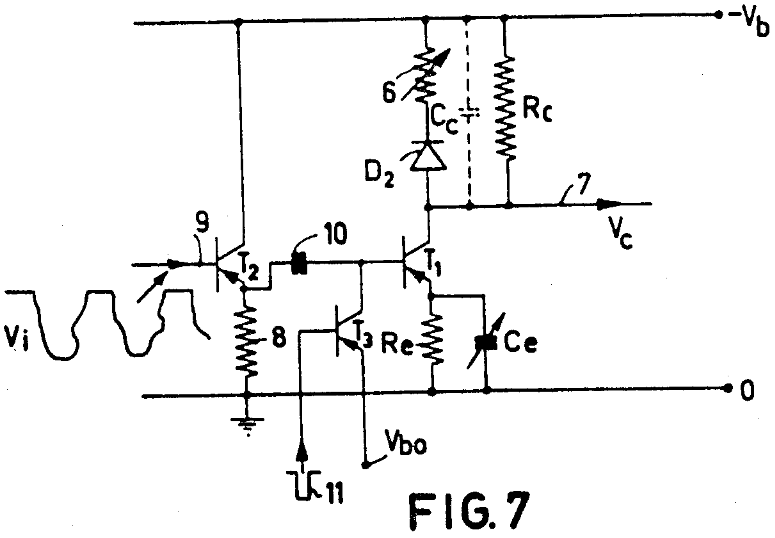
FIGURE 7 shows a second embodiment of the circuit according to the invention.

Another kind of embodiment in which the delay element is a diode is shown in FIGURE 7. In FIGURE 7 a transistor $T_1$ fulfills the same function as the amplifying tube $B_1$ in FIGURES 1 and 6. The collector circuit of transistor $T_1$ now includes a diode $D_2$ which acts as a delay element in series with which a variable resistor 6 is connected, whilst another resistor $R_c$ is connected parallel to the series-combination of the diode $D_2$ and resistor 6. The elements $D_2$, 6 and $R_c$ together constitute the output impedance for the transistor $T_1$ so that the output signal $V_c$ derived from a lead 7, may be developed across this output impedance.

The diode $D_2$ has a non-linear current-voltage characteristic the non-linearity of which is adjustable by means of the variable resistor 6 which, if the diode $D_2$ has the desired non-linearity, may be dispensed with.

A dual use is made of the non-linearity of the diode $D_2$ in the circuit of FIGURE 7, firstly to ensure that the dark portions in the image are amplified with a smaller bandwidth than are the bright portions and, secondly, to bring about the required correction of gamma for the television signal to be amplified. It will be evident that the gamma correction is brought about as a result of the fact that the diode $D_2$ has a non-linear current-voltage characteristic. The fact that the bright portions in the image are thus also amplified with a greater bandwidth than the dark portions in the image may be explained as follows:

The fact that the diode $D_2$ has a non-linear current-voltage characteristic implies that its internal resistance is a function of the amplitude of the applied signal, that is to say the diode $D_2$ has a differential resistance. The diode $D_2$ will thus have a high internal resistance for small amplitudes of the applied signal and a low internal resistance for great amplitudes. From this it follows that the collector impedance of transistor $T_1$, which is formed by the elements $D_2$, 6 and $R_c$, will have a comparatively high value for signals of small amplitude so that its amplification will be comparatively great, but that the bandwidth will be comparatively small due to the constant presence of the parasitic capacitance $C_o$ which plays the same part in the circuit of FIGURE 7 as the parasitic capacitor $C_a$ in the circuits of FIGURES 1 and 6. This may also be expressed in such manner that for a high impedance $R'_c$ of the collector where $R'_c$ is forced by the elements $D_2$, 6 and $R_c$, the limiting frequency which is determined by the equation:

$$\omega=\frac{1}{R'_cC_o}$$

will also be low. In other words the amplification is high for the dark portions in the image but the bandwidth is small.

However, the diode $D_2$ has a low internal resistance for the bright portions in the image which have a great amplitude. This implies that the total impedance $R'_c$ of the collector will have decreased and hence the limiting frequency increased. In other words in this case also it is achieved by the provision of the diode $D_2$ that the bandwidth is greater for the bright portions in the image than for the dark portions, but it is then to be considered that the amplification for the dark portions is greater in absolute value than for the bright portions. Since, as explained in the preamble, the amplification must be satisfactory precisely for the higher frequencies which are determinative of the bright portions in the image, the emitter lead of transistor $T_1$ also includes a frequency-dependent negative feedback network comprising an emitter resistor $R_e$ and a capacitor $C_e$, which capacitor is of the variable type to adjust the required frequency-dependency. By providing this negative feedback network it is ensured that the negative feedback will be great for the low frequencies and progressively decrease for the higher frequencies. In other words the greater amplification for the dark portions of low frequencies will be compensated by the said negative feedback network with respect to the amplification for the bright portions of higher frequencies. The circuit of FIGURE 7 thus permits of obtaining a frequency response curve similar to that obtained with the circuit of FIGURE 1 and is shown in FIGURE 5, a frequency response curve as shown in FIGURE 3 corresponding, as before, to the dark portions in the image.

FIGURE 7 also shows in which manner the input signal $V_i$ of negative polarity is applied to the base of transistor $T_1$. In fact, the transistor $T_1$ is preceded by a pre-amplifying stage connected as an emitter follower and comprising a transistor $T_2$ and an emitter resistor 8. The input signal $V_i$ of negative polarity is applied to a base 9 of the transistor $T_2$. The signal developed at the emitter of the transistor $T_2$ is applied through a coupling capacitor 10 to the base of transistor $T_1$. Connected to this base is also a third transistor $T_3$ which serves to reintroduce the direct-current component which has got lost in the capacitor 10 and possible before. To this end, the emitter of transistor $T_3$ is connected to a terminal voltage $V_{bo}$ to which the signal $V_i$ is fixed during the flyback period. To this end, negative flyback pulses 11 are applied to the base of transistor $T_3$ so that the transistor $T_3$ can convey current only during the occurrence of the pulses 11 when the signal $V_i$ is at black level. It is thus achieved that the black level of the signal set up at the base of transistor $T_1$ is each time fixed at the value determined by the bias $V_{bo}$.

It will be evident that the circuit of FIGURE 7 may alternatively be equipped with tubes in which event the transistors $T_1$, $T_2$ and $T_3$ are to be replaced by tubes.

Lastly, it should be noted that the amplifying circuits described can be used in receiving as well as transmitting equipment. However, they are especially important at the pick-up side since the signal derived from a pick-up tube such, for example, as an image iconoscope or a vidicon tube may have a small amplitude so that the input noise of the amplifier plays an important part. Improvement of the signal-to-noise ratio at the pick-up side is therefore of special importance. It will be evident, however, that it may also be important at the receiving end to improve the signal-to-noise ratio by means of the amplifying circuit described.

What is claimed is:

1. A video amplifier comprising first and second amplifier devices each having a common electrode, an input electrode and an output electrode, an output circuit connected in common to the output electrodes of said first and second devices, a source of video signals, means applying said video signals to said input electrodes, and means applying different bias voltages to said common electrodes, whereby the bandwidth of signals in said output circuit is dependent upon the amplitude of video signals applied to said input electrodes.

2. A video amplifier for amplifying television signal comprising first and second amplifier means each having an input terminal and an output terminal, a source of video signals, means applying said video signals to said input terminals, a common output circuit connected to sai

BEST AVAILABLE COPY output terminals, the combination of said first amplifier means and output circuit having a lower bandwidth in the absence of said second amplifier means than the combination of said second amplifier means and output circuit has in the absence of said first amplifier means, and bias means connected to said second amplifier means whereby said second amplifier means is operative only when video signals applied thereto have predetermined amplitudes.

3. The video amplifier of claim 2, wherein said second amplifier means comprises frequency dependent negative feedback means providing a decreasing negative feedback factor with increase in frequency.

4. A video amplifier for television signals comprising first and second amplifier devices each having an input electrode, an output electrode, and a common electrode, a source of video signals, a source of operating voltage having first and second terminals, means applying said video signals between said input electrodes and said first terminal, a common output circuit connected between said output electrodes and second terminal, means connecting the common electrode of said first device to said first terminal, a parallel resistance-capacitance circuit connected between said first terminal and the common electrode of said second device, and resistor means connected between said second terminal and the common electrode of said second device for biasing said second device, whereby video signals below a predetermined amplitude are amplified only by said first device with a first predetermined bandwidth, and video signals above said predetermined amplitude are amplified by both of said devices with a second predetermined bandwidth greater than said first predetermined bandwidth.

5. A video amplifier for television signals comprising first and second amplifier devices each having an input electrode, an output electrode, and a common electrode, a source of video signals, a source of operating voltage having first and second terminals, means applying said video signals between said input electrode of said first device and said first terminal, impedance means connected between the common electrode of said first device and said first terminal, means connecting said common electrode of said first device to the input electrode of said second device, a common output circuit connected between said output electrodes and second terminal, a parallel resistance-capacitance circuit connected between said first terminal and the common electrode of said second device, and resistor means connected between said second terminal and the common electrode of said second device for biasing said second device, whereby video signals below a predetermined amplitude are amplified only by said first device with a first predetermined bandwidth, and video signals above said predetermined amplitude are amplified by both of said devices with a second predetermined bandwidth greater than said first predetermined bandwidth.

6. A video amplifier for television signals comprising an amplifier device having input, output and common electrodes, a source of operating potential having first and second terminals, a source of video signals, means applying said signals between said input electrode and first terminal, a load resistor connected between said output electrode and second terminal, a frequency dependent negative feedback network comprising a parallel circuit of a resistor and a capacitor connected between said common electrode and first terminal, whereby the negative feedback factor of said network decreases as the frequency of said signals increases, and an impedance means connected in parallel with said load resistor, said impedance means having a continuous non-linear current voltage characteristic in the range of voltages across said load resistor, whereby the bandwidth of signals across said load resistor is a continuous function of the instantaneous amplitude of signals applied to said input electrode.

7. The amplifier of claim 6 in which said impedance means comprises a diode, and means connecting said diode in parallel with said load resistor with a polarity so that said diode is continuously conductive.

8. The amplifier of claim 7 comprising a linear resistor connected in series with said diode.

References Cited

UNITED STATES PATENTS

| | | | |
|---|---|---|---|
| 2,254,855 | 9/1941 | Poch | 178—7.5 X |
| 2,514,022 | 7/1950 | Bedford | 178—7.5 X |
| 2,514,117 | 7/1950 | Bedford | 178—7.5 |
| 2,527,737 | 10/1950 | Jordan | 330—178 |
| 2,584,332 | 2/1952 | Crooker et al. | 178—7.3 |
| 2,627,022 | 1/1953 | Anderson | 325—401 |
| 2,717,931 | 9/1955 | Duke | 178—7.14 |
| 2,774,866 | 12/1956 | Burger | 325—319 |
| 3,038,072 | 6/1962 | Proudfit | 325—319 |

JOHN W. CALDWELL, *Primary Examiner.*

R. L. RICHARDSON, *Assistant Examiner.*